(12) United States Patent
Kruglick (10) Patent No.: US 10,067,792 B2
(45) Date of Patent: Sep. 4, 2018

(54) FINITE AUTOMATA MANAGER AND METHOD TO PRE-FETCH DATA FOR A PROCESSOR CORE

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 123 days.

(21) Appl. No.: 15/104,125

(22) PCT Filed: Feb. 12, 2014

(86) PCT No.: PCT/US2014/016015
§ 371 (c)(1),
(2) Date: Jun. 13, 2016

(87) PCT Pub. No.: WO2015/122883
PCT Pub. Date: Aug. 20, 2015

(65) Prior Publication Data
US 2016/0321107 A1 Nov. 3, 2016

(51) Int. Cl.
*G06F 9/46* (2006.01)
*G06F 9/30* (2018.01)
(Continued)

(52) U.S. Cl.
CPC .............. *G06F 9/50* (2013.01); *G06F 9/48* (2013.01); *G06F 12/0862* (2013.01); *G06F 2212/1024* (2013.01); *G06F 2212/6026* (2013.01)

(58) Field of Classification Search
None
See application file for complete search history.

(56) References Cited

U.S. PATENT DOCUMENTS 6,327,508 B1 12/2001 Mergard
7,096,322 B1 8/2006 Sollom et al.
(Continued)

OTHER PUBLICATIONS

"Cache Lines are the New Registers," Simon Ask, accessed at http://web.archive.org/web/20121028160712/http://simonask.tumblr.com/post/30645840195/cache-lines-are-the-new-registers, posted on Sep. 1, 2012, pp. 2.

(Continued)

*Primary Examiner* — Bing Zhao (57) ABSTRACT

Technologies are generally described for systems, devices and methods effective to select program instructions for a hardware finite automaton on a multi-core processor that includes two or more cores. A hardware finite automata manager may identify executable instructions associated with a particular one of the cores of the multi-core processor. The hardware finite automata manager may determine that the hardware finite automaton is available to be used. The hardware finite automata manager, in response to the determination that the hardware finite automaton is available, may select at least one program instruction based on the executable instructions. The at least one program instruction may be configured to modify the hardware finite automaton to pre-fetch data. The hardware finite automaton manager may transmit the at least one program instruction to the hardware finite automaton.

11 Claims, 6 Drawing Sheets

(51) Int. Cl.
    G06F 13/00    (2006.01)
    G06F 9/50    (2006.01)
    G06F 12/0862    (2016.01)
    G06F 9/48    (2006.01)

(56) References Cited

U.S. PATENT DOCUMENTS

| | | | |
|---|---|---|---|
| 8,688,961 B2* | 4/2014 | Accapadi | G06F 12/0862 711/137 |
| 2003/0115021 A1 | 6/2003 | Mates | |
| 2012/0159510 A1 | 6/2012 | Kumar et al. | |
| 2013/0339622 A1 | 12/2013 | Ambroladze et al. | |

OTHER PUBLICATIONS

"Network processor," Wikipedia, accessed at http://web.archive.org/web/20130603200923/http://en.wikipedia.org/wiki/Network_processor, modified on Feb. 28, 2013, pp. 3.

Annavaram, M., et al., "Data Prefetching by Dependence Graph Precomputation," In Proc. the 28th International Symposium on Computer Architecture, vol. 29, Issue 2, pp. 52-61 (Jun. 30-Jul. 4, 2001).

Byna, S., "Data Prefetching in the Era of Multicore Processors," accessed at http://web.archive.org/web/20130320025633/http://www.multicoreinfo.com/prefetching-multicore-processors, accessed on May 13, 2016, pp. 8.

Byna, S., et al., "Parallel I/O prefetching using MPI- le caching and I/O signatures," In Proc. the International Conference on High Performance Computing, Networking, Storage and Analysis (SC'08), Article No. 44, pp. 1-12 (Nov. 15, 2008).

Byna, S., et al., "Taxonomy of Data Prefetching for Multicore Processors," Journal of Computer Science and Technology, vol. 24, Issue 3, pp. 405-417 (May 26, 2009).

Choi, I., et al., "Experience with Improving Distributed Shared Cache Performance on Tilera's Tile Processor," IEEE Computer Architecture Letters, vol. 10, No. 2, pp. 45-48 (Jul.-Dec. 2011).

Dash, S. K, and Srikanthan, T., "Rapid Estimation of Instruction Cache Hit Rates Using Loop Profiling," ASAP '08 Proceedings of the 2008 International Conference on Application-Specific Systems, Architectures and Processors, pp. 263-268 (Jul. 2, 2008).

Ding, Y., and Zhang, W., "Loop-Based Instruction Prefetching to Reduce the Worst-Case Execution Time," IEEE Transactions on Computers, vol. 59, Issue 6, pp. 855-864 (Jun. 2010).

Doweck, J., "Inside Intel® Core™ Microarchitecture and Smart Memory Access," White paper, Intel Corporation, pp. 1-12 (Aug. 3, 2006).

Ganusov, I., and Burtscher, M., "Future execution: A hardware prefetching technique for chip multiprocessors," 14th International Conference on Parallel Architectures and Compilation Techniques (PACT'05), pp. 350-360 (Sep. 17-21, 2005).

Haring, R., and B. G. Team., "The Blue Gene/Q Compute Chip," In The 23rd Symposium on High Performance Chips (Hot Chips), pp. 1-20 (Aug. 8, 2011).

International Search Report and Written Opinion for International Application No. PCT/US14/16015, dated Jul. 11, 2014, 9 pages.

Jiang, W., et al., "Scalable Multi-pipeline Architecture for High Performance Multi-pattern String Matching." IEEE International Symposium on Parallel & Distributed Processing (IPDPS), pp. 1-12 (Apr. 19-23, 2010).

Kandiraju, G.B., and Sivasubramaniam, A., "Going the distance for TLB prefetching: An application-driven study," ISCA '02 Proceedings of the 29th annual international symposium on Computer architecture, pp. 195-206 (May 25-29, 2002).

Kessler, R.E., "Cavium 32 Core OCTEON II CN68xx," Cavium Inc., Hot Chips 23, pp. 1-33 (Aug. 2011).

Kim, J., et al., "A Framework for Data Prefetching Using Offline Training of Markovian Predictors," In Proc. the 2002 IEEE International Conference on Computer Design: VLSI in Computers and Processors, pp. 340-347 (Sep. 16-18, 2002).

Krishnan, P., and Vitter, J. S., "Optimal Prediction for Prefetching in the Worst Case." SIAM Journal on Computing, vol. 27, Issue 6, pp. 1617-1636 (Dec. 1998).

Luk, C. K., and Mowry, T. C., "Compiler-based prefetching for recursive data structures," In Proc. the 7th International Conference on Architectural Support for Programming Languages and Operating Systems, pp. 222-233 (Oct. 1, 1996).

Miniman, S., "SDN, OpenFlow and OpenStack Quantum," wikibon, accessed at http://web.archive.org/web/20131015121120/http://wikibon.org/wiki/v/SDN%2C_OpenFlow_and_OpenStack_Quantum, updated on Jul. 17, 2013, pp. 2.

Papermaster, M., "HC24-K1: The Surround Computing Era," Youtube, accessed at http://www.youtube.com/watch?v=oi4eq5arzp8, Published on Sep. 14, 2012, pp. 2.

Rabbah, R. M., et al., "Compiler orchestrated pre-fetching via speculation and predication," In Proc. the 11th International Conference on Architecture Support of Programming Languages and Operating Systems, pp. 189-198 (Oct. 7, 2004).

Ship, H.L., "Every Programmer Should Know These Latency Numbers," accessed at http://web.archive.org/web/20130413014655/http://architects.dzone.com/articles/every-programmer-should-know, Jun. 12, 2012, pp. 4.

Wiseman, C., et al., "A Remotely Accessible Network Processor-Based Router for Network Experimentation," in Proceedings of the 4th ACM/IEEE Symposium on Architectures for Networking and Communications Systems, pp. 20-29 (Nov. 6, 2008).

Yang, C-L., "The Push Architecture: A Prefetching Framework for Linked Data Structures," Department of Computer Science, Duke Univeristy, pp. 149 (2001).

Yoon, D.H., et al., "The dynamic granularity memory system," ACM SIGARCH Computer Architecture News, vol. 40, Issue 3, pp. 548-559 (Jun. 2012).

Zhou, H., "Dual-core execution: Building a highly scalable single-thread instruction window," 14th International Conference on Parallel Architectures and Compilation Techniques (PACT'05), pp. 231-242 (Sep. 17-21, 2005).

Zilles, C., and Sohi, G., "Execution-based prediction using speculative slices," Proceedings of the 28th annual international symposium on Computer architecture, vol. 29, Issue 2, pp. 2-13 (Jul. 2001).

* cited by examiner

FINITE AUTOMATA MANAGER AND METHOD TO PRE-FETCH DATA FOR A PROCESSOR CORE

CROSS-REFERENCE TO RELATED APPLICATION

This application is a U.S. National Stage filing under 35 U.S.C. § 371 of International Application No. PCT/US14/160154, filed on Feb. 12, 2014, the entirety of which is hereby incorporated by reference.

BACKGROUND

Unless otherwise indicated herein, the materials described in this section are not prior art to the claims in this application and are not admitted to be prior art by inclusion in this section.

In a computing architecture, a processor core may be associated with one or more caches and main memories. Although caches may have faster access times relative to main memory, caches may typically be orders of magnitude smaller than main memory. Data and executable instructions may be stored in main memory and may be placed into a cache for relatively faster access.

SUMMARY

In one example, methods to select program instructions for a hardware finite automaton on a multi-core processor that includes two or more cores are generally described. The methods may include, by a hardware finite automata manager, identifying executable instructions associated with a particular one of the cores of the multi-core processor. The methods may further include, by a hardware finite automata manager, determining that the hardware finite automaton is available to be used. The methods may further include, in response to the determination that the hardware finite automaton is available, selecting by a hardware finite automata manager, at least one program instruction based on the executable instructions. The at least one program instruction may be configured to modify the hardware finite automaton to pre-fetch data. The methods may further include, by a hardware finite automaton manager, transmitting the at least one program instruction to the hardware finite automaton.

In one example, hardware finite automata managers are generally described. The hardware finite automata managers may include a service manager and an engine manager. The engine manager may be configured to be in communication with the service manager. The service manager may be effective to identify at least one executable instruction associated with a particular core of a multi-core processor. The engine manager may be effective to determine that a hardware finite automaton is available to be used. In response to the determination that the hardware finite automaton is available, the engine manager may be further effective to select at least one program instruction based on the at least one executable instruction. The at least one program instruction may be configured to instruct the hardware finite automaton to pre-fetch data. The engine manager may be further effective to transmit the at least one program instruction to the hardware finite automaton.

In one example, multi-core processors are generally described. The multi-core processors may include two or more processor cores. The multi-core processors may further include a hardware finite automaton and a hardware finite automata manager configured to be in communication with the two or more processor cores and the hardware finite automaton. The hardware finite automata manager may be effective to identify at least one executable instruction associated with a particular core of the two or more cores. The hardware finite automata manager may be further effective to determine that a hardware finite automaton is available to be used. In response to the determination that the hardware finite automaton is available, the hardware finite automata manager may be further effective to program the hardware finite automaton so as to generate a programmed hardware finite automaton. The programmed hardware finite automaton may be effective to fetch data prior to execution of the at least one executable instruction by the particular core. The programmed hardware finite automaton may be further effective to provide the fetched data to be stored in a storage unit associated with the particular core.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

This disclosure is generally drawn to, inter alia, methods, apparatus, systems, devices, and computer program products related to a finite automata manager.

Briefly stated, technologies are generally described for systems, devices and methods effective to select program instructions for a hardware finite automaton on a multi-core processor that includes two or more cores. A hardware finite automata manager may identify executable instructions associated with a particular one of the cores of the multi-core processor. The hardware finite automata manager may determine that the hardware finite automaton is available to be used. The hardware finite automata manager, in response to the determination that the hardware finite automaton is available, may select at least one program instruction based on the executable instructions. The at least one program instruction may be configured to instruct the hardware finite automaton to pre-fetch data. The hardware finite automaton manager may transmit the at least one program instruction to the hardware finite automaton.

Figure 1:
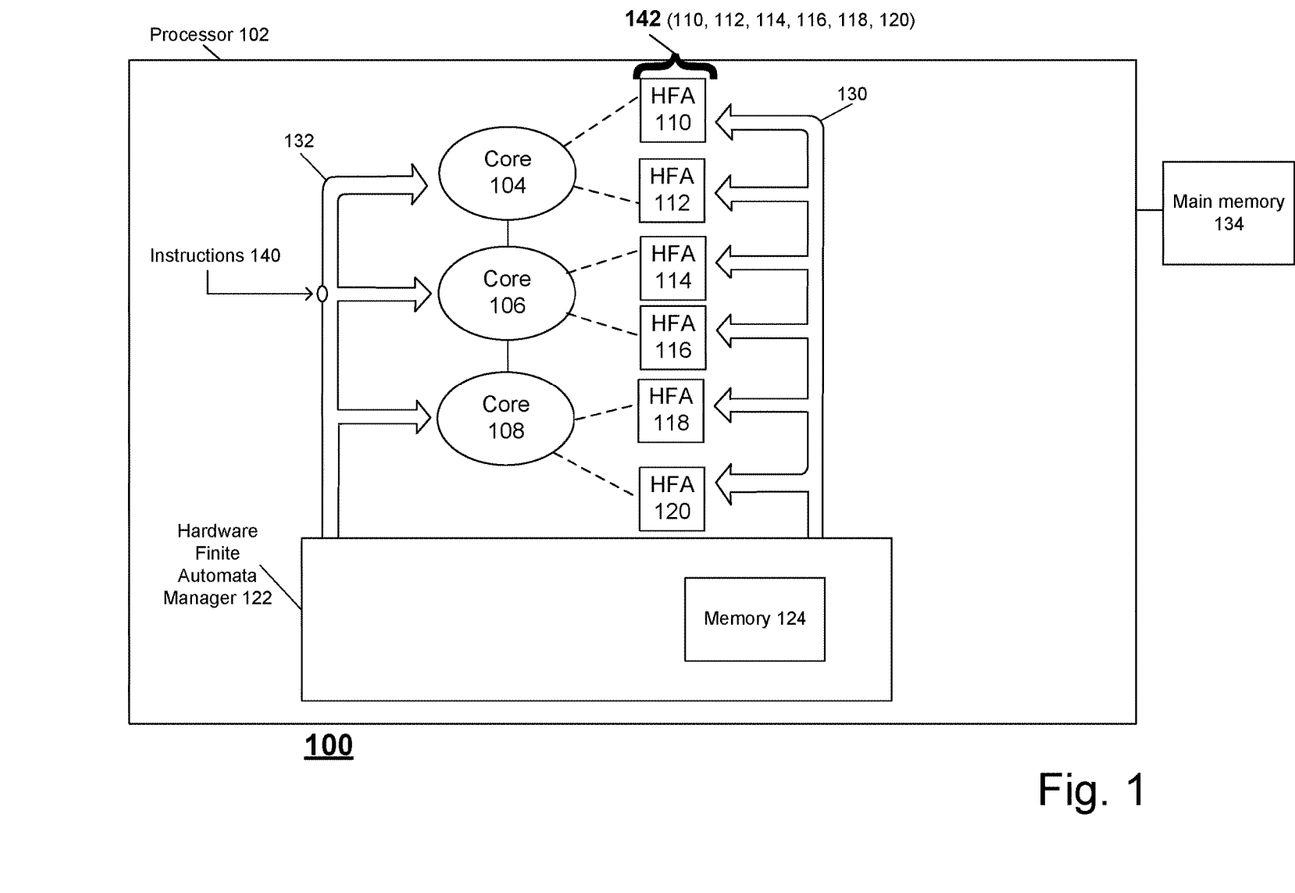
FIG. 1 illustrates an example system that can be utilized to implement a hardware finite automata manager.

FIG. 1 illustrates an example system that can be utilized to implement a hardware finite automata manager, arranged in accordance with at least some embodiments described herein. An example system 100 may include a processor 102 and a main memory 134 configured to be in communication with processor 102. Main memory 134 may be a storage unit configured to store data or instructions. Processor 102 may include one or more cores, including cores 104, 106 and 108. Cores 104, 106 and 108 may be configured in communication with one another and may be configured to execute one or more executable instructions 140. Executable instructions 140 may be, for example, program instructions or network processing instructions. Network processing instructions may be, for example, instructions to perform packet processing.

Processor 102 may include (or may be operatively coupled to) one or more hardware finite automata ("HFAs") 142, including hardware finite automaton (HFA) 110, hardware finite automaton 112, hardware finite automaton 114, hardware finite automaton 116, hardware finite automaton 118 and hardware finite automaton 120. Hardware finite automata 142 may be hardware configured to transition between a number of distinct states. Hardware finite automata 142 may be comprised of one or more shift registers and connection circuitry. In an example, hardware finite automata 142 may include a state machine In a further example, a bit position in a binary code may specify a different state for each shift register of hardware finite automaton 142. Hardware finite automata 142 may include configurable logic gates that may be programmable to perform one or more logical operations. Hardware finite automata 142 may be associated with one or more of cores 104, 106 and/or 108. For example, hardware finite automaton 110 and hardware finite automaton 112 may be associated with core 104; hardware finite automaton 114 and hardware finite automaton 116 may be associated with core 106; and hardware finite automaton 118 and hardware finite automaton 120 may be associated with core 108. Alternatively, in another example, hardware finite automata 142 may be accessible by any of cores 104, 106 and 108 in processor 102.

Hardware finite automata 142 may be used to perform network/packet processing tasks. A particular network/packet processing task may benefit from use of one or more of hardware finite automata 110, 112, 114, 116, 118 and/or 120. In an example, executable instructions 140 may comprise instructions to perform network processing on one or more packets. Hardware finite automata 110, 112, 114, 116, 118 and 120 may perform load balancing and/or routing of the one or more packets.

Processor 102 may include a hardware finite automata manager 122. Hardware finite automata manager 122 may be hardware, or may be a combination of hardware and instructions executable by the hardware. Hardware finite automata manager 122 may control programming of hardware finite automata 142. Hardware finite automata manager 122 may include a memory 124. Memory 124 may be located within hardware finite automata manager 122 or at another location. Hardware finite automata manager 122 may communicate with cores 104, 106 and/or 108 via link 132. Link 132 may be, for example, a bus or other linkage configured to communicate data, instructions, and/or other signal(s). Hardware finite automata manager 122 may communicate with hardware finite automata 142 (including HFA 110, 112, 114, 116, 118 and 120) via link 130. Link 130 may be, for example, a bus or other linkage configured to communicate data, instructions, and/or other signal(s). Links 130 and 132 may be isolated links or may be coupled to each other and/or to other element(s). As described in more detail below, hardware finite automata manager 122 may be configured to instruct hardware finite automata 142 to perform certain tasks based on instructions 140.

Figure 2:
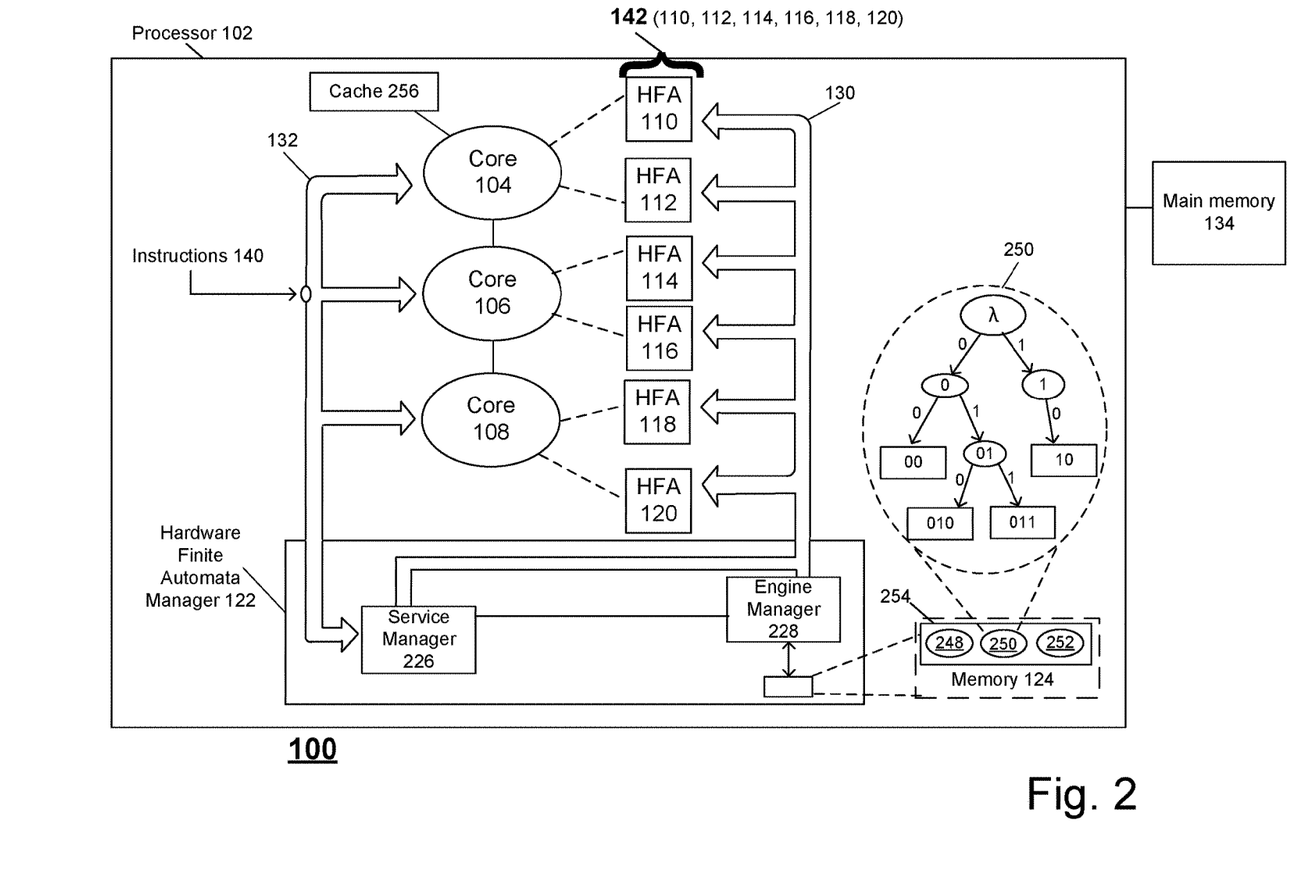
FIG. 2 illustrates the example system of FIG. 1 illustrating additional details relating to a hardware finite automata manager.

FIG. 2 illustrates the example system of FIG. 1 with additional details relating to a hardware finite automata manager, arranged in accordance with at least some embodiments described herein. Those components in FIG. 2 that are labeled identically to components of FIG. 1 will not be described again for the purposes of clarity and brevity.

Hardware finite automata manager 122, or components of hardware finite automata manager 122, may be configured to route one or more executable instructions 140 to one or more available hardware finite automata 142. Hardware finite automata manager 122 may detect an availability of hardware finite automata 142. For example, during a particular packet processing task, HFA 110, HFA 112 and HFA 116 may be employed to perform packet inspection. In the example, hardware finite automata manager 122 may detect that HFA 114, HFA 118 and HFA 120 are available, as these HFAs may not be currently in use. For example, a particular HFA may store one or more bits in a register to indicate whether or not the particular HFA is available or in use. Hardware finite automata manager 122 may access the bits in the register to determine whether or not the particular HFA is available.

Hardware finite automata manager 122 may include a service manager 226. Service manager 226 may be hardware or may be a combination of hardware and instructions executable by the hardware, and may be configured to receive and copy executable instructions 140. Service manager 226 may receive instructions 140 via link 132. Service manager 226 may transmit one or more of instructions 140 and/or one or more copies of executable instructions 140 to one or more hardware finite automata 142. For example, service manager 226 may instruct a pertinent core to forward instructions 140 to an available HFA. In some examples, links 130 and 132 may share the same architecture and instructions 140 may be sent to both the pertinent core and available HFA at the same time.

Service Manager 226 may be configured in communication with an engine manager 228. Engine manager 228 may be hardware or may be a combination of hardware and instructions executable by the hardware. Based on executable instructions 140, engine manager 228 may be configured to determine one or more pre-fetch hardware finite automata designs from memory 124. For example, a pre-fetch hardware finite automata design may be selected based on a pattern of memory accesses associated with executable instructions 140. Some examples of pre-fetch hardware automata designs may include stride pre-fetch designs, branch prediction pre-fetch designs (also known as "b-fetchers"), pull-based pre-fetching designs, run-ahead execution based pre-fetch designs, etc. Memory 124 may store a pre-fetch HFA design table 254. Pre-fetch HFA design table 254 may be a data structure configured to store one or more pre-fetch hardware finite automata designs including pre-fetch hardware automata designs 248, 250 and/or 252. Pre-fetch hardware automata designs 248, 250 and 252 may include one or more program instructions. For example, pre-fetch hardware automata designs 248, 250 and 252 may comprise at least one program instruction configured to modify and/or instruct hardware finite automata 142 to pre-fetch data from a memory (such as main memory 134) based on executable instructions 140.

Pre-fetching may involve recognizing patterns in executable instructions 140 and anticipating data and instruction requirements of a processor core based on the recognized patterns. Data and instructions that are anticipated to be required may be cached in one or more caches, such as in cache 256, or other storage units associated with one or more processor cores that are processing executable instructions 140. Engine manager 228 may be configured to retrieve one or more pre-fetch hardware automata designs from memory 124 based on executable instructions 140. Engine manager 228 may program and/or modify one or more available hardware finite automata 142 with the retrieved one or more pre-fetch hardware automata designs. Alternatively, in cases where available hardware finite automata 142 is already configured to perform pre-fetching, engine manager 228 may instruct available hardware finite automata 142 to begin pre-fetching based on copies of executable instructions 140. One or more available hardware finite automata 142 may be programmed or modified via link 130. Engine manager 228 may program available hardware finite automata 142 by reconfiguring one or more logic gates of available hardware finite automata 142.

In an example, hardware finite automata manager 122 may detect that HFA 112 is available (e.g. not in use). Core 108 may be processing executable instructions 140. Service manager 226 may copy executable instructions 140, prior to or as executable instructions 140 are provided to core 108 for processing. Service manager 226 may route copies of instructions 140 to engine manager 228. Based on the copies of executable instructions 140, engine manager 228 may determine an appropriate pre-fetch hardware finite automata design from pre-fetch HFA design table 254. The appropriate pre-fetch hardware finite automata design may be optimized or otherwise tailored to perform pre-fetching for the particular executable instruction 140. For example, if executable instruction 140 includes a FOR loop which accesses incremental memory locations, engine manager 228 may select a stride pre-fetch design from pre-fetch HFA design table 254. Engine manager 228 may retrieve the appropriate pre-fetch hardware finite automata design and may program available HFA 112 using the design. Service manager 226 may continue to copy executable instructions 140 and may provide copies of the instructions to programmed HFA 112. Programmed HFA 112 may perform pre-fetching or identify pre-fetch targets based on the provided copies of executable instructions 140. Based on the pre-fetching, cache 256 associated with core 108 may be populated with pre-fetched data and/or instructions from, for example, main memory 134. In an example, HFA 112 may provide pre-fetched data and/or instructions to cache 256. Cache management logic may control storage of pre-fetched data and/or instructions in cache 256 based on contents of cache 256.

Figure 3:
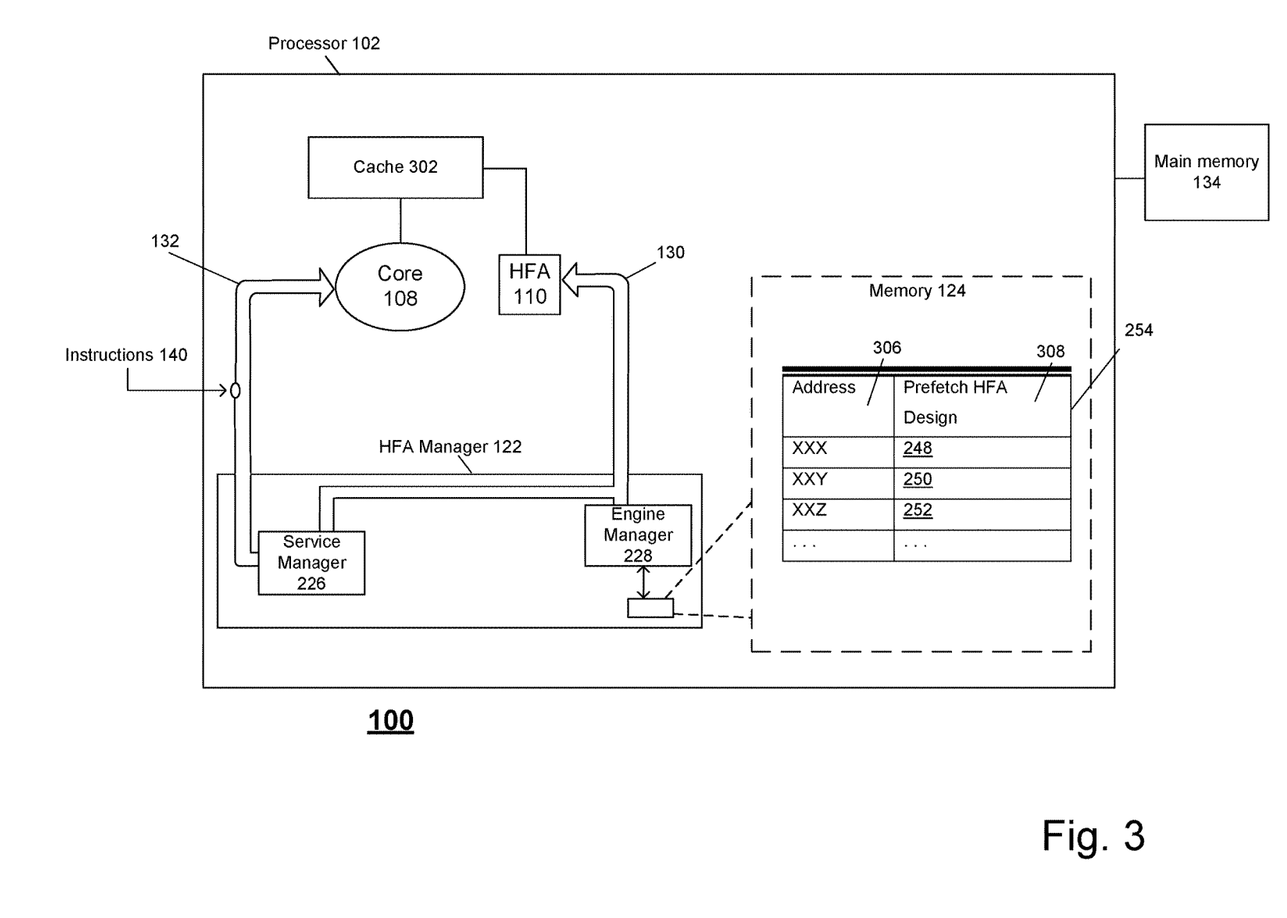
FIG. 3 illustrates the example system of FIGS. 1 and 2 with additional details relating to a pre-fetch hardware finite automata design table.

In an example, available hardware finite automata 112 may be programmed to perform pre-fetching for a particular core 104, 106 or 108. In the example, the number of cores executing instructions may exceed the number of available hardware finite automata. Core access to pre-fetch programmed HFAs may be prioritized by hardware finite automata manager 122, based on, for example, a number of cache misses of each core, a number of memory accesses by the cores, based on accuracy of pre-fetching for the particular instructions being executed by the core, based on a profile match of instructions 140 to a pre-fetch engine in library 354, and/or based on other factor(s). In an example, cores 104, 106 and 108 may be processing executable instructions 140. Hardware finite automata manager 122 may determine that cores 104 and 108 have experienced 27 and 41 cache misses, respectively, during processing. Hardware finite automata manager 122 may determine that core 106 has experienced 213 cache misses during processing. In the example, one or more available HFAs may be programmed to perform pre-fetching for core 106 as core 106 has experienced a higher number of cache misses relative to cores 104 and 108.

In another example, hardware finite automata 142 that have been programmed to perform pre-fetching for a particular core 104, 106 and/or 108 may be reprogrammed to perform one or more network processing functions or other processing functions following execution of executable instructions 140. For example, HFA 116 may be programmed by pre-fetch hardware automata design 248 to perform pre-fetching for core 106. Following the execution of executable instructions 140 by core 106, HFA 116 may be reprogrammed to perform packet routing or another processing function.

FIG. 3 illustrates the example systems of FIGS. 1 and 2 with additional details relating to a pre-fetch hardware finite automata design table, arranged in accordance with at least some embodiments described herein. Those components in FIG. 3 that are labeled identically to components of FIGS. 1 and 2 will not be described again for the purposes of clarity and brevity.

In an example, hardware finite automata manager 122 may detect that HFA 110 is available (e.g. not in use). Core 108 may process executable instructions 140. Service manager 226 may copy executable instructions 140. Service manager 226 may route copies of instructions 140 to engine manager 228. Based on copies of executable instructions 140, engine manager 228 may determine an appropriate pre-fetch hardware finite automata design from pre-fetch HFA design table 254 of memory 124. Pre-fetch HFA design table 254 may include an "Address" field 306 and a "Pre-fetch HFA Design" field 308. Pre-fetch HFA Design field 308 may include one or more pre-fetch hardware finite automata designs (including pre-fetch hardware finite automata designs 248, 250 and 252). Pre-fetch hardware finite automata designs 248, 250 and 252 may be configured to perform pre-fetching on particular types of executable instructions 140.

In an example, pre-fetch hardware finite automata design "248" may be a stride pre-fetch design optimized or otherwise tailored to perform pre-fetching on a first type of algorithm, pre-fetch hardware finite automata design "250"

may be optimized or otherwise tailored to perform branch prediction pre-fetching on a second type of algorithm, and pre-fetch hardware finite automata design "252" may be optimized or otherwise tailored to perform push-based pre-fetching on a third type of algorithm Address field 306 may include a first address ("XXX") linked to pre-fetch hardware finite automata design 248, a second address ("XXY") linked to pre-fetch hardware finite automata design 250, and a third address ("XXZ") linked to pre-fetch hardware finite automata design 252. Addresses XXX, XXY and XXZ may include, for example, memory addresses, byte counts, offsets, and/or other parameter(s) of memory 124.

Engine manager 228 may retrieve the appropriate pre-fetch hardware finite automata design and may program available HFA 110 using the design. Service manager 226 may continue to copy executable instructions 140 and may provide copies of the instructions to the programmed HFA 110. Programmed HFA 110 may perform pre-fetching based on the provided copies of executable instructions 140. Based on the pre-fetching, cache 302 associated with core 108 may be populated with data pre-fetched from main memory 134.

Among other possible features, a system in accordance with the disclosure may increase processor utilization by using existing hardware finite automata to pre-fetch data thereby reducing latent periods while a processor is waiting for data stored in a memory. Additionally, network functionality may not be impacted as those hardware finite automata which are not in use for network/packet processing may be used as pre-fetchers. Such a system may help to compensate for the bottleneck experienced when memory speed lags behind processing speed in computing systems.

Figure 4:
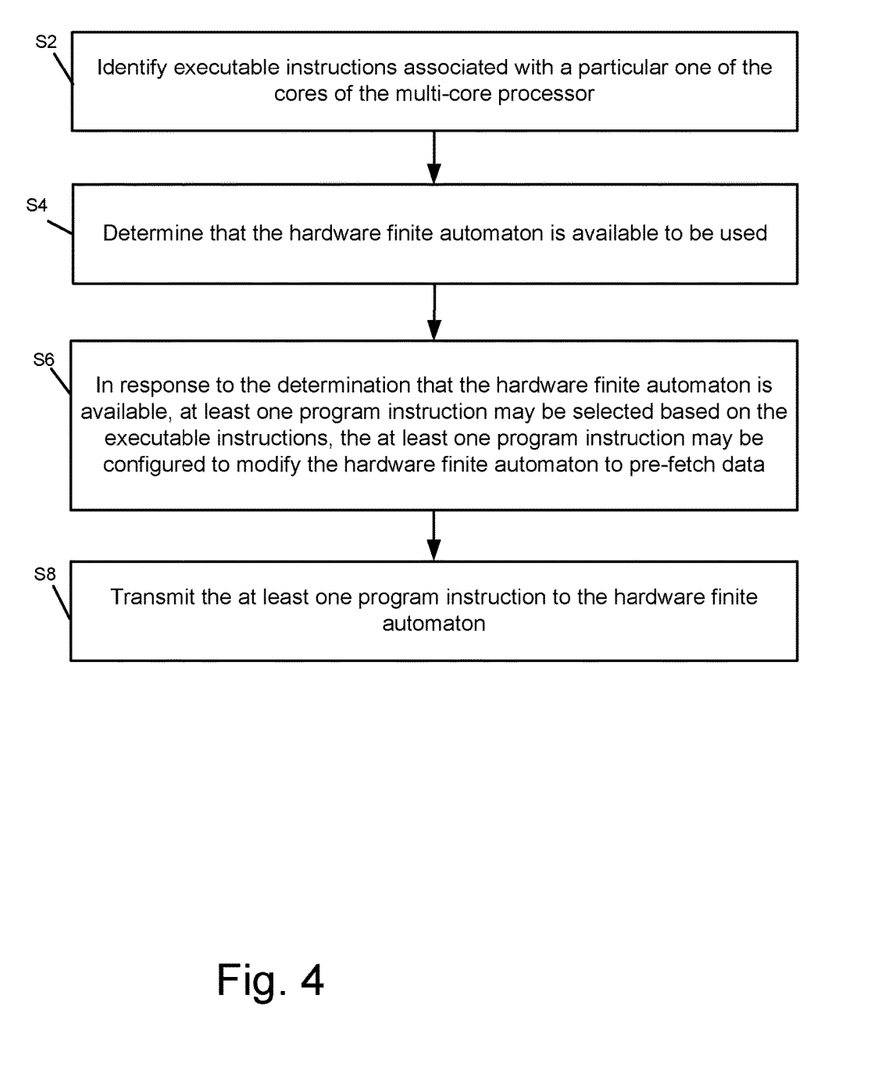
FIG. 4 depicts a flow diagram for an example process to implement a finite automata manager.

FIG. 4 depicts a flow diagram for an example process to implement a finite automata manager, arranged in accordance with at least some embodiments described herein. In some examples, the process in FIG. 4 could be implemented using system 100 discussed above. An example process may include one or more operations, actions, or functions as illustrated by one or more of blocks S2, S4, S6 and/or S8, etc. Although illustrated as discrete blocks, various blocks may be divided into additional blocks, combined into fewer blocks, or eliminated, depending on the particular implementation. Blocks may be supplemented with additional blocks representing other operations, actions, or functions. The process in FIG. 4 may be used by a multi-core processor (such as processor 102) that includes a one or more processor cores configured in communication with a memory, such as main memory 134, described above. The process in FIG. 4 may be used in a system that may include one or more hardware finite automata.

Processing may begin at block S2, "Identify executable instructions associated with a particular one of the cores of the multi-core processor." At block S2, executable instructions associated with a particular one of the cores of the multi-core processor may be identified. The executable instructions may be copied to produce a copy of the executable instructions. The copy of the executable instructions may be transmitted to the hardware finite automaton. The executable instructions may include first executable instructions. The particular core may include a first core. Prior to selecting the at least one program instruction, second executable instructions may be identified. The second executable instructions may be scheduled associated with a second core of the multi-core processor. A first number of cache misses experienced by the first core in execution of the first executable instructions may be determined. A second number of cache misses experienced by the second core in execution of the second executable instructions may be determined. The hardware finite automaton may be assigned to the first core based on the first and second numbers of cache misses.

Processing may continue from block S2 to block S4, "Determine that the hardware finite automaton is available to be used." At block S4, a determination may be made that the hardware finite automaton is available to be used.

Processing may continue from block S4 to block S6, where "In response to the determination that the hardware finite automaton is available, at least one program instruction may be selected based on the executable instructions, the at least one program instruction may be configured to modify the hardware finite automaton to pre-fetch data." At block S6, at least one program instruction may be selected based on the executable instructions, in response to the determination that the hardware finite automaton is available. The at least one program instruction may be configured to modify the hardware finite automaton to pre-fetch data from a memory. Data pre-fetched from the memory may be related to the executable instructions. Data may be pre-fetched from the memory using the hardware finite automaton and stored in a cache associated with the particular core.

Selecting the at least one program instructions based on the executable instructions may include selecting a first set of program instructions based on a first set of executable instructions. Selecting the at least one program instruction based on the executable instructions may include selecting a second set of program instructions based on a second set of executable instructions. The first set of program instructions may be different from the second set of program instructions and the first set of executable instructions may be different from the second set of executable instructions.

Processing may continue from block S6 to block S8, "Transmit the at least one program instruction to the hardware finite automaton." At block S8, the at least one program instruction may be transmitted to the hardware finite automaton. The hardware finite automaton may be programmed using the at least one program instruction following the execution of the executable instructions. The hardware finite automaton may be programmed to perform one or more network processing functions. A hardware finite automata manager (such as hardware finite automata manager 122) may be effective to reconfigure one or more logic gates of the hardware finite automaton to program the hardware finite automaton.

Figure 5:
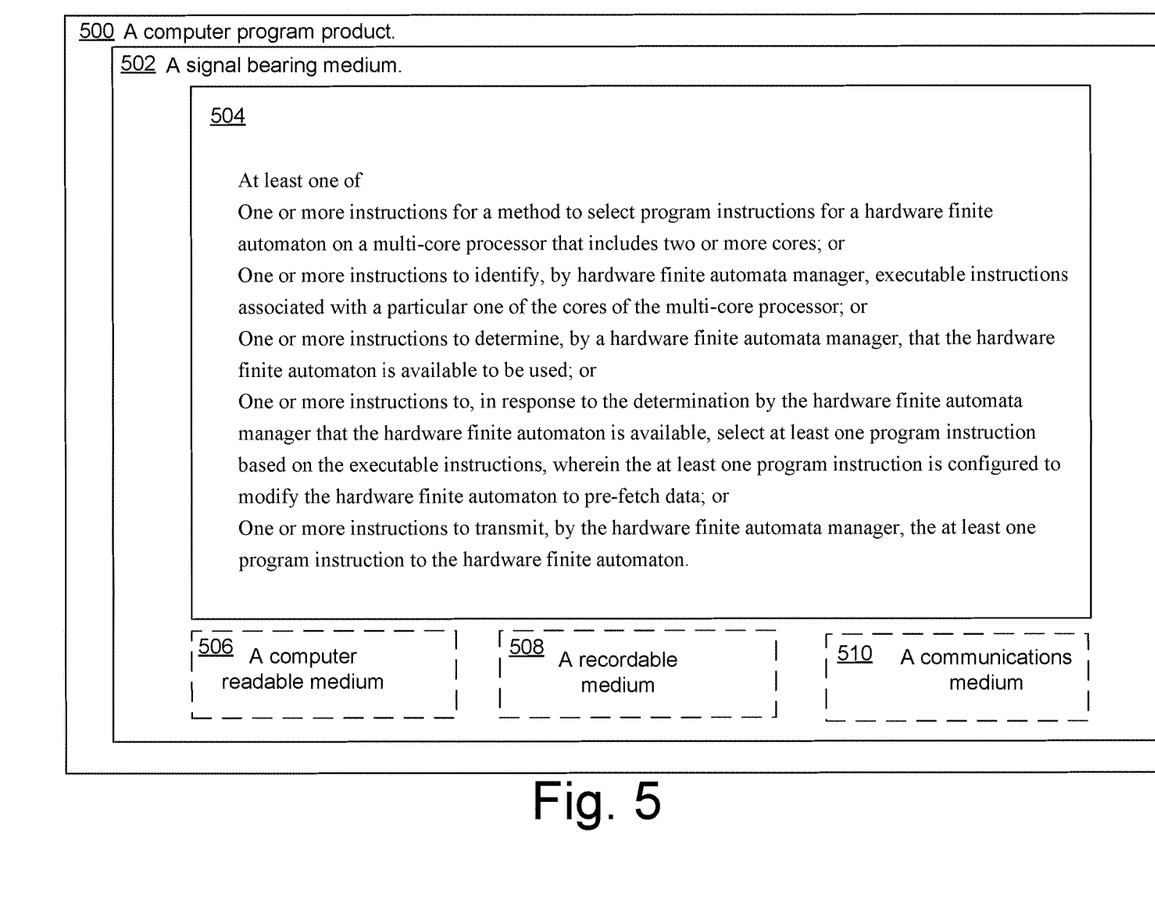
FIG. 5 illustrates an example computer program product that can be utilized to implement a finite automata manager.

FIG. 5 illustrates an example computer program product 500 that can be utilized to implement a finite automata manager arranged in accordance with at least some embodiments described herein. Program product 500 may include a signal bearing medium 502. Signal bearing medium 502 may include one or more instructions 504 that, in response to execution by, for example, a processor, may provide the operations, functionality, and features described above with respect to FIGS. 1-4. Thus, for example, referring to system 100, hardware finite automata manager 122 may undertake one or more of the blocks shown in FIG. 5 in response to instructions 504 conveyed to hardware finite automata manager 122 by medium 502.

In some implementations, signal bearing medium 502 may encompass a computer-readable medium 506, such as, but not limited to, a hard disk drive, a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, program product 500 may be conveyed to one or more modules of the hardware finite automata manager 122 by an RF signal bearing medium 502, where the signal bearing medium 502 is conveyed by a wireless communications medium 510 (e.g., a wireless communications medium conforming with the IEEE 802.11 standard).

Figure 6:
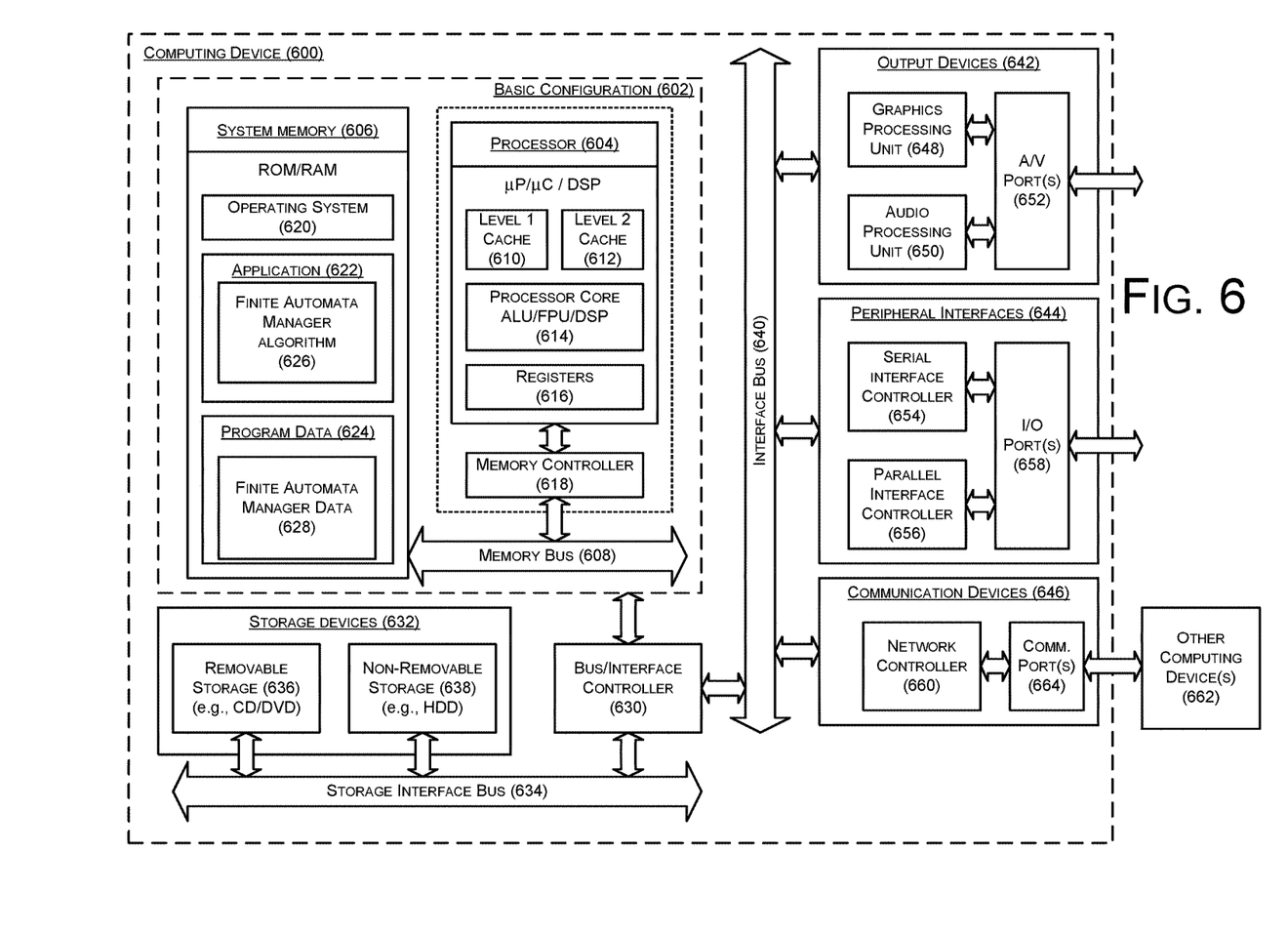
FIG. 6 is a block diagram illustrating an example computing device that is arranged to implement a finite automata manager; all arranged according to at least some embodiments described herein.

FIG. 6 is a block diagram illustrating an example computing device 600 that is arranged to implement a finite automata manager, arranged in accordance with at least some embodiments described herein. For example, the computing device 600 may be used to implement at least some of the components of system 100 previously described above. In a very basic configuration 602, computing device 600 typically includes one or more processors 604 (such as processor 102) and a system memory 606 (such as main memory 134). A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 (such as cores 104, 106, 108) may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a finite automata manager algorithm 626 that is arranged to perform the functions and operations as described herein including those described with respect to FIGS. 1-5 in connection with system 100, and/or that may be used to control operations of a finite automata manager as described herein. Program data 624 may include finite automata manager data 628 that may be usable by a finite automata manager in connection with its operation as is described herein. In some embodiments, application 622 may be arranged to operate with program data 624 in cooperation with operating system 620 such that a finite automata manager may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, one can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, one will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in to mean e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended to mean e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, one will recognize that the disclosure is also thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth. While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A hardware finite automata manager, comprising:
a service manager; and
an engine manager configured to be in communication with the service manager,
wherein the service manager is effective to:
identify at least one executable instruction associated with a particular core of a multi-core processor,
wherein the engine manager is effective to:
determine that a hardware finite automaton is available, wherein the hardware finite automaton is configured to perform a network processing task,
wherein the hardware finite automaton includes a plurality of shift registers and a plurality of logic gates;
in response to the determination that the hardware finite automaton is available, select at least one program instruction based on a pre-fetch hardware finite automata design, wherein the pre-fetch hardware finite automata design is selected based on the at least one executable instruction, and wherein the at least one program instruction is configured to instruct the hardware finite automaton to pre-fetch data for the particular core; and
transmit the at least one program instruction to the hardware finite automaton,
wherein the transmission of the at least one program instruction includes programming the hardware finite automaton to pre-fetch the data for the particular core, before the at least one executable instruction is executed by the particular core, and
wherein selecting the at least one program instruction includes:
identifying executable instructions associated with a particular core of the multi-core processor;
determining that the hardware finite automaton is available, wherein the hardware finite automaton is configured to perform a network processing task, and
wherein the hardware finite automaton includes a plurality of shift registers and a plurality of logic gates;

in response to the determination that the hardware finite automaton is available, selecting at least one program instruction based on a pre-fetch hardware finite automata design, wherein the pre-fetch hardware finite automata design is selected based on the executable instructions, and wherein the at least one program instruction is configured to instruct the hardware finite automaton to pre-fetch data for the particular core; and transmitting the at least one program instruction to the hardware finite automaton, wherein transmitting the at least one program instruction includes programming the hardware finite automaton to pre-fetch the data for the particular core, before the executable instructions are executed by the particular core, to reduce latency for the particular core to wait for the data.

2. The hardware finite automata manager of claim 1, wherein the service manager is further effective to:

copy the at least one executable instruction before the at least one executable instruction is executed by the particular core, to produce a copy of the at least one executable instruction; and transmit the copy of the at least one executable instruction to the hardware finite automaton.

3. The hardware finite automata manager of claim 1, further comprising a memory coupled to the engine manager and configured to store a plurality of pre-fetch hardware finite automata designs, wherein the engine manager is effective to program the hardware finite automaton with the at least one program instruction so as to correspond to the at least one stored pre-fetch hardware finite automata design such that the programmed hardware finite automaton is effective to pre-fetch the data from the memory.

4. The hardware finite automata manager of claim 3, wherein the engine manager is further effective to program the hardware finite automaton to:

store the pre-fetched data in a cache associated with the particular core.

5. The hardware finite automata manager of claim 1, wherein:

the at least one executable instruction includes first executable instructions, the particular core is a first core of the multi-core processor, and the engine manager is further effective to, prior to selection of the at least one program instruction:

identify second executable instructions associated with a second core of the multi-core processor;

determine a first number of cache misses experienced by the first core in execution of the first executable instructions;

determine a second number of cache misses experienced by the second core in execution of the second executable instructions; and assign the hardware finite automaton to the first core based on the first and second numbers of cache misses.

6. The hardware finite automata manager of claim 1, wherein the at least one executable instruction includes first and second sets of executable instructions, wherein to select the at least one program instruction based on the at least one executable instruction, the engine manager is effective to:

select a first set of program instructions based on the first set of executable instructions; and select a second set of program instructions based on the second set of executable instructions, and wherein the first set of program instructions is different from the second set of program instructions.

7. The hardware finite automata manager of claim 1, wherein the engine manager is further effective to program the hardware finite automaton, after execution of the at least one executable instruction, to perform the network processing task.

8. A multi-core processor, comprising:

two or more processor cores;

a hardware finite automaton; and a hardware finite automata manager configured to be in communication with the two or more processor cores and the hardware finite automaton, wherein the hardware finite automata manager is effective to:

identify at least one executable instruction associated with a particular core of the two or more processor cores;

determine that the hardware finite automaton is available, wherein the hardware finite automaton is configured to perform a network processing task, wherein the hardware finite automaton includes a plurality of shift registers and a plurality of logic gates;

in response to the determination that the hardware finite automaton is available, program the hardware finite automaton so as to generate a programmed hardware finite automaton, and wherein the programmed hardware finite automaton is effective to:

perform a fetch of data prior to execution of the at least one executable instruction by the particular core; and provide the fetched data to be stored in a storage unit associated with the particular core, wherein the hardware finite automata manager is configured to select at least one program instruction based on a pre-fetch hardware finite automata design, and wherein selecting the at least one program instruction includes:

identifying executable instructions associated with a particular core of the multi-core processor;

determining that the hardware finite automaton is available, wherein the hardware finite automaton is configured to perform a network processing task, and wherein the hardware finite automaton includes a plurality of shift registers and a plurality of logic gates;

in response to the determination that the hardware finite automaton is available, selecting at least one program instruction based on a pre-fetch hardware finite automata design, wherein the pre-fetch hardware finite automata design is selected based on the executable instructions, and wherein the at least one program instruction is configured to instruct the hardware finite automaton to pre-fetch data for the particular core; and transmitting the at least one program instruction to the hardware finite automaton, wherein transmitting the at least one program instruction includes programming the hardware finite automaton to pre-fetch the data for the particular core, before the executable instructions are executed by the particular core, to reduce latency for the particular core to wait for the data.

9. The multi-core processor of claim 8, wherein the storage unit associated with the particular core includes a cache.

10. The multi-core processor of claim 8, wherein the hardware finite automata manager is further effective to copy the at least one executable instruction.

11. The multi-core processor of claim 8, wherein to program the hardware finite automaton, the hardware finite automata manager is effective to reconfigure the plurality of logic gates of the hardware finite automaton.

\* \* \* \* \*

UNITED STATES PATENT AND TRADEMARK OFFICE
CERTIFICATE OF CORRECTION

PATENT NO. : 10,067,792 B2
APPLICATION NO. : 15/104125
DATED : September 4, 2018
INVENTOR(S) : Kruglick Page 1 of 1

It is certified that error appears in the above-identified patent and that said Letters Patent is hereby corrected as shown below:

In the Specification

In Column 1, Line 10, please delete "160154" and insert -- 16015 -- therefor.

Signed and Sealed this
Seventh Day of April, 2020

Andrei Iancu
*Director of the United States Patent and Trademark Office*